United States Patent
Webster et al.

(10) Patent No.: US 6,661,857 B1
(45) Date of Patent: Dec. 9, 2003

(54) RAPID ESTIMATION OF WIRELESS CHANNEL IMPULSE RESPONSE

(75) Inventors: Mark A. Webster, Palm Bay, FL (US); Keith R. Baldwin, Melbourne Beach, FL (US); George R. Nelson, Merritt Island, FL (US)

(73) Assignee: Intersil Americas Inc., Milpitas, CA (US)

( * ) Notice: Subject to any disclaimer, the term of this patent is extended or adjusted under 35 U.S.C. 154(b) by 651 days.

(21) Appl. No.: 09/612,823

(22) Filed: Jul. 10, 2000

(51) Int. Cl.[7] ................................................. H04B 1/10
(52) U.S. Cl. ....................................................... 375/350
(58) Field of Search ................................. 375/350, 355, 375/368, 316; 708/300; 455/464, 515, 135, 151.2

(56) References Cited

U.S. PATENT DOCUMENTS 6,347,120 B1 * 2/2002 Sakoda ........................ 375/259
6,381,229 B1 * 4/2002 Narvinger et al. .......... 370/328

* cited by examiner

Primary Examiner—Khai Tran
(74) Attorney, Agent, or Firm—Gary R Stanford

(57) ABSTRACT

A channel estimator for use with the wireless digital data receiver facilitates processing of a preamble symbol sequence received over a multipath communication channel to enable the impulse response of the channel to be rapidly estimated, and thereby set the parameters of the receiver's decision feedback equalizer. During the preamble dwell interval, selected estimates of one or more received preamble symbols within a plurality of successive data symbols are repeated, in order to generate a longer sequence of preamble symbol estimates. The receiver's processor then employs this longer sequence of data symbol values, to solve an associated set of linear equations for estimating the multipath channel's impulse response.

13 Claims, 5 Drawing Sheets

$$\text{Corr} = \sum_{k=0}^{127} a_k \text{ Barker} \longrightarrow \boxed{h_k} \longrightarrow \boxed{\text{BARKER CORRELATOR}}$$

FIG. 5

$$\begin{bmatrix} b_7 & b_6 & b_5 & b_4 & b_3 & b_2 & b_1 & b_0 \\ b_8 & b_7 & b_6 & b_5 & b_4 & b_3 & b_2 & b_1 \\ b_9 & b_8 & b_7 & b_6 & b_5 & b_4 & b_3 & b_2 \\ b_{10} & b_9 & b_8 & b_7 & b_6 & b_5 & b_4 & b_3 \\ b_{11} & b_{10} & b_9 & b_8 & b_7 & b_6 & b_5 & b_4 \\ b_{12} & b_{11} & b_{10} & b_9 & b_8 & b_7 & b_6 & b_5 \\ b_{13} & b_{12} & b_{11} & b_{10} & b_9 & b_8 & b_7 & b_6 \\ b_{14} & b_{13} & b_{12} & b_{11} & b_{10} & b_9 & b_8 & b_7 \\ b_{15} & b_{14} & b_{13} & b_{12} & b_{11} & b_{10} & b_9 & b_8 \\ b_{16} & b_{15} & b_{14} & b_{13} & b_{12} & b_{11} & b_{10} & b_9 \\ b_{17} & b_{16} & b_{15} & b_{14} & b_{13} & b_{12} & b_{11} & b_{10} \end{bmatrix} \begin{bmatrix} h_0 \\ h_1 \\ h_2 \\ h_3 \\ h_4 \\ h_5 \\ h_6 \\ h_7 \end{bmatrix} = \begin{bmatrix} c_0 \\ c_1 \\ c_2 \\ c_3 \\ c_4 \\ c_5 \\ c_6 \\ c_7 \\ c_8 \\ c_9 \\ c_{10} \end{bmatrix}$$

FIG. 6

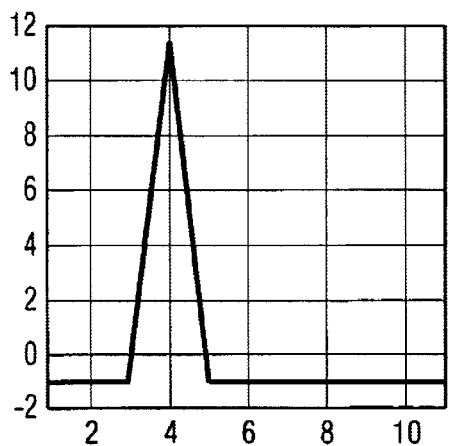

FIG. 7

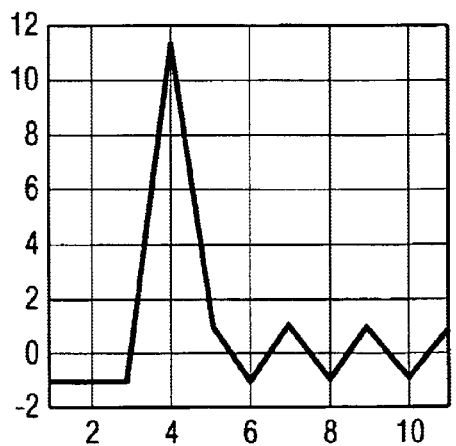

FIG. 8

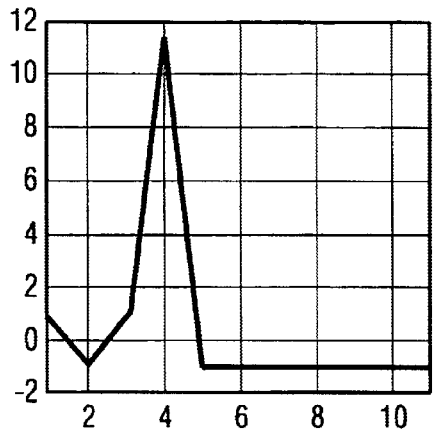
FIG. 9
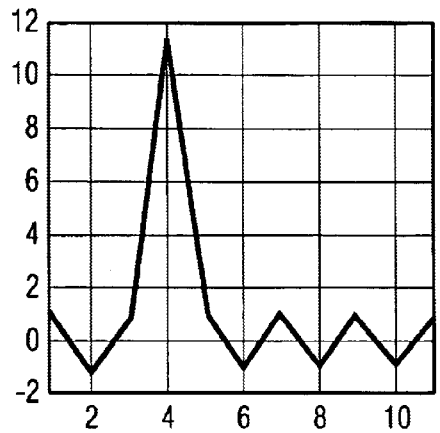
FIG. 10
| DATA PATTERN $(d_0 d_1 d_2 d_3)$ | $c_0$ | $c_1$ | $c_2$ | $c_3$ | $c_4$ | $c_5$ | $c_6$ | $c_7$ | $c_8$ | $c_9$ | $c_{10}$ |
|---|---|---|---|---|---|---|---|---|---|---|---|
| 0000 1111 | -0.5 | +11.5 | -0.5 | -6.5 | -0.5 | -0.5 | -0.5 | -0.5 | -0.5 | -0.5 | -0.5 |
| 0001 1110 | -0.5 | +11.5 | +1.5 | -6.5 | +1.5 | -0.5 | +1.5 | -0.5 | +1.5 | -0.5 | +1.5 |
| 0010 1101 | +1.5 | +10.5 | -0.5 | +4.5 | -0.5 | -1.5 | -0.5 | -1.5 | -0.5 | -1.5 | -0.5 |
| 0011 1100 | +0.5 | +10.5 | -1.5 | +4.5 | -0.5 | -1.5 | -0.5 | -1.5 | -0.5 | -1.5 | -0.5 |
| 0100 1011 | +0.5 | +10.5 | +0.5 | +4.5 | +1.5 | -1.5 | +1.5 | -1.5 | +1.5 | -1.5 | +1.5 |
| 0101 1010 | +1.5 | +10.5 | +1.5 | +4.5 | +1.5 | -1.5 | +1.5 | -1.5 | +1.5 | -1.5 | +1.5 |
| 0110 1001 | -1.5 | +11.5 | +0.5 | -6.5 | +1.5 | -0.5 | +1.5 | -0.5 | +1.5 | -0.5 | +1.5 |
| 0111 1000 | -1.5 | +11.5 | -1.5 | -6.5 | -0.5 | -0.5 | -0.5 | -0.5 | -0.5 | -0.5 | -0.5 |
TABLE
FIG. 11

$$22 \times 22 \qquad 22 \times 1 \qquad 22 \times 1$$

$11 \times 22 \begin{bmatrix} B_{--++} \\ \text{-------} \\ B_{-++-} \end{bmatrix} \begin{bmatrix} h_0 \\ h_1 \\ h_2 \\ \vdots \\ h_{19} \\ h_{20} \\ h_{21} \end{bmatrix} = \begin{bmatrix} C_{--++} \\ \text{-------} \\ C_{-++-} \end{bmatrix} \begin{matrix} 11 \times 1 \\ \\ 11 \times 1 \end{matrix}$

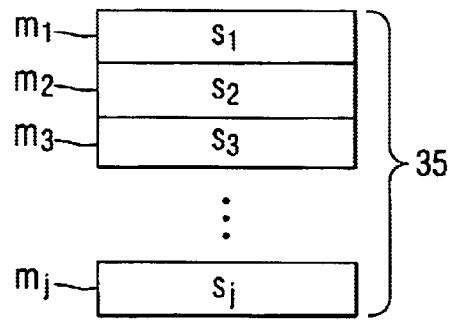
FIG. 14
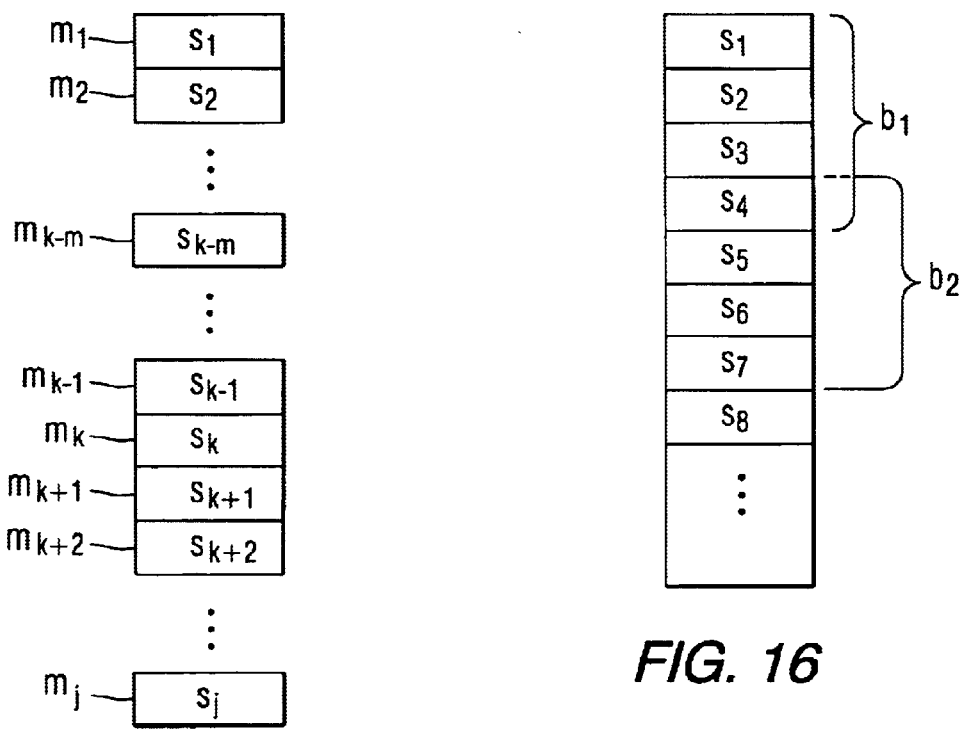
FIG. 15
FIG. 16

RAPID ESTIMATION OF WIRELESS CHANNEL IMPULSE RESPONSE

FIELD OF THE INVENTION

The present invention relates in general to wireless communication systems, such as but not limited to wireless local area networks (WLANs), and is particularly directed to a new and improved mechanism that may be readily incorporated into the digital processing circuitry of a wireless receiver's decision feedback equalizer, to facilitate processing of a preamble symbol sequence received over a multipath communication channel in order to enable the impulse response of the channel to be rapidly estimated, and thereby set the parameters of the equalizer.

BACKGROUND OF THE INVENTION

The ongoing demand for faster (higher data rate) wireless communication products has been the subject of a number of proposals before the IEEE 802.11 committee, including those involving the use of a standard for the 2.4 GHz portion of the spectrum, which FCC Part 15.247 requires be implemented using spread spectrum techniques that enable intra-packet data rates to exceed 10 Mbps Ethernet speeds. The 802.11 committee's 2.4 GHz standard covers only one and two Mbps data rates, that use either frequency hopping (FH) or direct sequence (DS) spread spectrum (SS) techniques. This FCC requirement for the use of spread spectrum signaling takes advantage of inherent SS properties that make the signals more robust to inadvertent interference—by lowering the average transmit power spectral density, and through receiver techniques which exploit spectral redundancy and thus combat self-interference created by multipath.

The substantially exponentially-decayed Rayleigh fading characteristic of the power delay profile (the variation in mean signal power with respect to its power dispersed across time) of a signal transmitted within an indoor WLAN system results from the relatively large number of reflectors (e.g., walls) within the building between transmitter and receiver, and the propagation loss associated with the respectively later time-of-arrival propagation paths containing (logarithmically) weaker energies. A principal aspect of the exponentially decayed multipath effect is the fact that a signal's propagation delay is proportional to the total distance traveled, so that, on-average, the strongest (minimal obstruction containing) transmission paths are those whose signals are the earliest to arrive at the receiver. In general, for any given transmission, a first to arrive, direct or line-of-sight path from transmitter to receiver may encounter an attenuating medium (such as one or more building walls and the like), while a later arriving signal reflected off a highly reflective surface and encounter no attenuating media may be have a larger amplitude channel impulse response (CIR) than the first-to-arrive signal. On average, however, such occurrences are few in number relative to echo signals which follow the CIR peak.

In terms of a practical application, the root mean squared (RMS) delay spread of a multipath channel may range from 20–50 nsec for small office and home office (SOHO) environments, 50–100 nsec for commercial environments, and 100–200 nsec for factory environments. For exponentially faded channels, the (exponential) decay constant is equal to the RMS delay spread. For relatively low signal bandwidths (less than 1 MHz), fading due to multipath is mostly 'flat'. However, at bandwidths above 1 MHz, for example at the 10 MHz bandwidth required by a direct sequence spread spectrum (DSSS) system to attain the above-referenced higher data rate of 10 Mbps, fading becomes selective with frequency, constituting a serious impediment to reliable communications over a multipath channel. Thus, multipath distortion within a WLAN environment can cause severe propagation loss over the ISM band.

One approach to counter this multipath distortion problem is to use a channel-matched correlation receiver, commonly referred to as a 'RAKE' receiver, which employs a DSSS structure having a transmitted bandwidth wider than the information bandwidth. In a DSSS signal structure, a respective codeword is formed of a sequence of PN code 'chips', which may be transmitted using a relatively simple modulation scheme such as BPSK or QPSK, and codeword chips may be fixed as in a signature sequence, or they may be pseudo random. In addition, phase modulation of a codeword may be used to convey information.

As diagrammatically illustrated in FIG. 1, in a DSSS (RAKE) receiver, the (spread) signal is received and digitized by an RF front end 10 and associated A-D converter 12, and then coupled to a multipath effect compensation device 14, which may be implemented using a decision feedback equalizer (DFE) within the signal path through a codeword correlator and coherent multipath combiner. The taps of the DFE 14 are established by a channel impulse response (CIR) estimation processor 16, which is typically programmed to solve a set of linear equations, parameters for which are derived from a training preamble sequence transmitted prior to commencement of an actual data transmission session. The output of the DFE is coupled to downstream circuitry 18, such as a peak or largest value detector, to derive the transmitted codeword. The performance of the CIR estimation processor 16 is limited by the fact that the channel estimate can only be as long as the spreading sequence, and the fact that no spreading sequence has perfect autocorrelation properties (no sidelobes and a non-zero main lobe). Thus, the challenge is to arrive at a reasonably 'good quality' estimate of the channel (whose length is initially unknown) within a relatively brief period of time (or dwell interval).

SUMMARY OF THE INVENTION

Pursuant to the present invention, this objective is successfully achieved by a new and improved signal processing mechanism executed by the decision feedback equalizer's associated channel estimate processor, which is operative to reduce the 'wait' time required to obtain sufficient data symbol estimates to obtain a reasonably accurate estimate of the channel impulse response. For this purpose, in the course of processing received symbols of the preamble sequence, selected estimates of one or more received preamble symbols within a plurality of successive data symbols are repeated in order to generate a longer sequence of preamble symbol estimates.

The ability to repeat a data symbol as the next data symbol in the sequence for the purpose of estimating the behavior of the channel is due to the fact that it can be reasonably expected that the manner in which the channel affects any particular portion of the transmitted energy will similarly affect an immediately adjacent portion of the energy. Hence, two or more immediately adjacent symbols can be expected to exhibit a similar influence of the channel, allowing a received data symbol to be repeated as a 'pseudo' symbol value for the next symbol time. The processor then employs this longer sequence of data symbol values, to solve an associated set of linear equations for estimating the channel impulse response (CIR).

In accordance with a preferred embodiment, as a plurality or block of successively received preamble data symbol values are received and stored, one or more of the most recent values of that block of successive symbol values are repeated to create one or more 'pseudo' symbols at the front end portion of the next block of successive preamble symbols. This repeated use of a selected number of symbol values of an already received preamble symbol block allows the data symbol values of the next block to be populated within a shorter time than would be required, were the processor to wait for all preamble symbols of the next block to be received.

For the solving a system of eight linear equations to estimate the channel, as a reduced complexity non-limiting illustrative example, with a block length of four symbols, and a single symbol repeat or overlap between blocks, repeating the last (fourth) symbol of a first block as the first symbol of the next successive block means that it is only necessary to receive a reduced number K (e.g., seven) symbols $s_1$–$s_7$ to realize a total of K+M (or eight) symbols $s^1$, $s_2$, $s_3$, $s_4$, $s_4$, $s_5$, $s_6$, $s_7$ of a dual block $b_1$+$b_2$ of preamble symbols for channel estimate matrix multiplication. The matrices by which the blocks of actually received data symbols are selectively repeated and multiplied are preferably precalculated and stored in a look-up table in association with all possible data symbol sequences that can be transmitted.

For the example of eight symbols per channel estimate calculation, the look-up table would contain a total of $2^8$ or 256 different sets of precalculated matrices. Since the mutual influence of adjacent symbols within all possible symbol sequences may be determined apriori, the parameters of the precalculated matrices may be precalculated so as to remove the effects of sidelobes. For the k+m or eight symbols $s_1$, $s_2$, $s_3$, $s_4$, $s_4$, $s_5$, $s_6$, $s_7$, the address of the look-up table from which a prestored set of matrix parameters is accessed may be readily defined in accordance with binary values that are produced by a modulation detector for the those symbols.

BRIEF DESCRIPTION OF THE DRAWINGS

FIG. 5 shows a signal flow path representation of cross-correlation values Corr as a composite effect of the Barker word, spreading sequence $a_k$, the channel impulse response $h_k$ and the receive Barker correlator.;

FIG. 6 shows respective matrices associated with the matrix equation [B]*[h]=[c];

FIG. 7 is a Barker correlation for symbol pattern [+1, +1];

FIG. 8 is a Barker correlation for symbol pattern [+1, −1];

FIG. 9 is a Barker correlation for symbol pattern [−1, +1];

FIG. 10 is a Barker correlation for symbol pattern [−1, −1];

FIG. 11 contains a Table that summarizes eight possible calculated Barker correlations at a receiver;

FIG. 14 shows successive memory addresses of the processor of FIG. 13 containing successive symbols supplied from the actual symbol value transport path of FIG. 13;

FIG. 15 shows symbol contents $s_{k-m}$–$s_k$ of a prescribed number j of successive memory addresses $m_{k-m}$–$m_k$ of a first block $b_1$ of successive memory addresses $m_1$–$m_k$, containing k successive symbols $s_1$–$s_k$ are used to generate the first m symbols for the next block $b_2$ of k successive symbols; and FIG. 16 shows repeating the fourth symbol $s_4$ of a first block $b_1$ of symbols $s_1$–$s_4$ as the first symbol of the next successive block $b_2$ of symbols $s_4$–$s_7$ of eight symbols $s_1$, $s_2$, $s_3$, $s_4$, $s_4$, $s_5$, $s_6$, $s_7$ used for channel estimate matrix multiplication.

DETAILED DESCRIPTION

Figure 1:
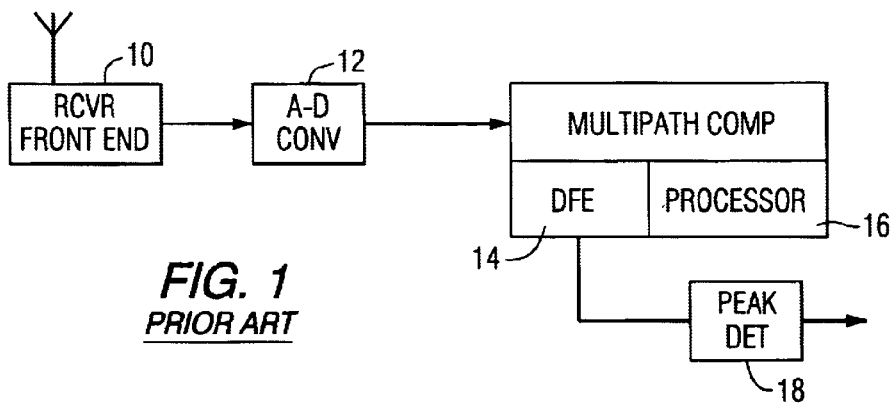
FIG. 1 diagrammatically illustrates the general architecture of a DSSS receiver.

Before describing details of the new and improved channel impulse response estimation mechanism of the present invention, it should be observed that the invention resides primarily in modular arrangements of conventional digital communication circuits and associated digital signal processing components and attendant supervisory control circuitry therefor, that controls the operations of such circuits and components. In a practical implementation that facilitates their incorporation into existing printed circuit cards of wireless telecommunication equipment, these modular arrangements may be readily implemented as field programmable gate array (FPGA)—implementation, application specific integrated circuit (ASIC) chip sets, programmable digital signal processors, or general purpose processors.

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

In order to facilitate an appreciation of the manner in which the channel impulse response (CIR) estimation mechanism of the present invention enables the impulse response of the channel, and thereby the parameters of a decision feedback equalizer of a wireless digital data receiver, to be rapidly obtained through 'repeated' use of selected symbol portions of a preamble symbol sequence received from the multipath communication channel, it is useful to review the overall functionality and performance of a decision feedback equalizer in the context of the spreading code employed. As a non-limiting example, a "spreading" sequence used to transmit a 1 Mbps sync symbol preamble will be the eleven chip Barker code sequence: +1, −1, +1, +1, −1, +1, +1, +1, −1, −1, −1.

Figure 2:
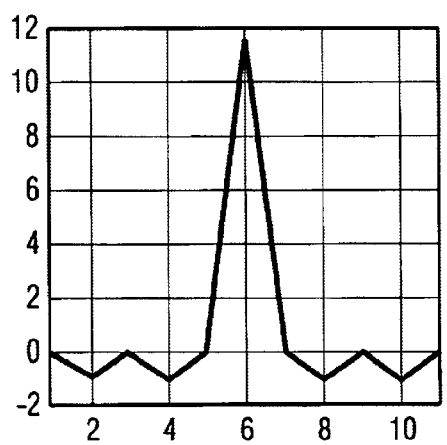
FIG. 2 is a graphical representation of a Barker code autocorrelation function $C_k$.

Barker codes have the unique property that sidelobes of their autocorrelation function $C_k$, defined below in equation (1), never exceed unity in magnitude for k not equal to 0. FIG. 2 is a graphical representation of this autocorrelation function.

$$C_k = \sum_{i=1}^{11-k} X_i X_{i+k} \qquad (1)$$

Figure 3:
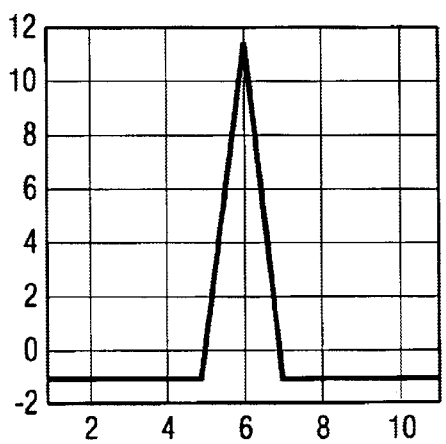
FIG. 3 shows a Barker code cross-correlation pattern obtained for the same the transmitted sync symbols.
Figure 4:
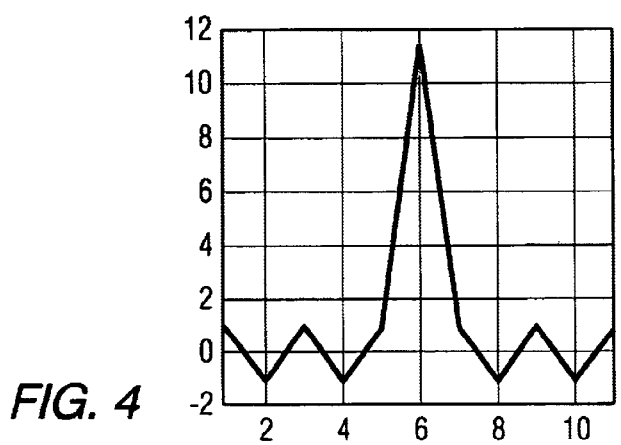
FIG. 4 shows a Barker code cross-correlation pattern obtained for the case that the sync symbols prior to spreading are different.

For this property to hold true, it is assumed that all adjacent symbols equal zero. This is not, however, the case for the sync symbols in the preamble. As a result, depending on the pattern of the sync symbols, two very different cross-correlation patterns may be obtained. When the transmitted sync symbols prior to being spread are the same, the sidelobe values are all −1, as shown in FIG. 3. When the sync symbols prior to "spreading" are different, however, the sidelobe values alternate between +1 and −1, as shown in FIG. 4. It turns out that a unique property of Barker words is an approximation to the effect of equally likely random binary data adjacent to the Barker word. The pattern shown in FIG. 2 is the average of the cross-correlation patterns of FIGS. 3 and 4.

The primary mechanism available at the receiver to estimate the channel impulse response is Barker correlations calculated from chip soft decisions. FIG. 5 shows a signal flow path representation of cross-correlation values Corr as a composite effect of the Barker word, spreading sequence $a_k$, the channel impulse response $h_k$ and the receive Barker correlator. The cross-correlation values Corr calculated from the chip soft decisions are not sufficient enough to initialize the equalizer for two reasons.

The first reason is that they are too short. Typical performance design goals require a decision feedback equalizer having a number of taps (e.g., at least three feedforward and fifteen feed-back taps) that exceeds the length of the chip sequence (eleven in the present example). An additional issue associated with this short estimate is where to draw the line between pre-cursor information and post-cursor information. There is nothing to indicate whether the value just upstream of the correlation peak is post-cursor information from the previous symbol delayed by ten chips or really one chip ahead pre-cursor information. A second issue is the fact that the calculated Barker correlations are actually the desired channel impulse response convolved with a Barker cross-correlation function similar to those shown in FIGS. 3 and 4. This effect may be mathematically represented by the following equation (2):

$$Corr = \sum_{k=0}^{127} a_k Barker \otimes h_k \otimes Barker \qquad (2)$$

Since these are all linear operations, the principle of superposition may be used to reorder the operations as the following equation (3).

$$Corr = \sum_{k=0}^{127} a_k Barker \otimes Barker \otimes h_k = \sum_{k=0}^{127} a_k B_k \otimes h_k \qquad (3)$$

In the receiver, three of the four variables in the final equation are either known apriori or known by estimation. The Barker cross-correlations Corr are calculated based on the chip soft decisions. The symbol hard decisions $a_k$ can be estimated using a differential demodulation of the Barker correlation peak bin. The Barker self cross-correlation sequences $b_k$ can be pre-calculated. This leaves a matrix solution for the unknown channel impulse response values $h_k$.

The matrix manipulation and math required may be readily understood by considering the following case for estimating eight channel impulse response taps $h_k$. In this simplified example, the transmitted preamble header sync symbols are all ones (no scrambling). This means that the Barker self cross-correlation values that populate the values $b_k$ are those shown in FIG. 3. The Barker correlation $c_k$ column vector length will always be eleven (the length of the Barker sequence). The matrix equation [B]*[h]=[c] is shown in FIG. 6.

Multiplying both sides of the equation by the Hermetian transpose $B^H$ yields $[B^H B]h=B^H c$. Using the substitutions $R=B^H B$ and $p=B^H c$ the equation reduces to Rh=p. This equation can be easily solved as $h=R^{-1}p$. Most of the difficulty with the solution for the unknown channel impulse response $h_k$ is not in the matrix math, but rather in figuring out how to populate the B and c matrices. For example, to align the peak of the channel impulse response $h_k$ with sample $h_2$, it is necessary to control where the peak of the Barker correlation matrix $c_k$ exists. For this example, the peak will be assumed to exist at element $c_3$. These locations must be determined ahead of time, because the values that populate the B matrix will have been already stored in memory. In fact, the entire matrix $R^{-1}=[B^H B]^{-1}$ can be calculated ahead of time. In the present example, the values that populate B come from repeated copies of the data in FIG. 3. To ensure that $h_2$ and $c_3$ are aligned, the peak of the Barker self cross-correlation needs to be at sample $b_8$, since the value of $c_3$ results from multiplying the fourth row of B by the h column. The eighteen elements that make up the b array are as follows: [−1, −1, −1, −1, −1, −1, −1, −1, +11, −1, −1, −1, −1, −1, −1, −1, −1, −1]. (This same mechanism applies to the solution of the unknown channel impulse response $h_k$, and the matrix data alignment will be discussed below for the more general solution.)

If it is assumed that there is precursor information in the channel impulse response, the Barker correlations calculated from the chip soft decisions must be aligned such that the peak is somewhere to the right of the first bin. This means that calculated Barker correlations not only depend on the current symbol but on the previous symbol. As an example, consider the case where the channel impulse response is only a single impulse. The calculated Barker correlation patterns at the receiver are obtained from FIGS. 3 and 4.

FIG. 7 shows the Barker correlation for a symbol pattern [+1, +1]—which looks exactly like a left-shifted version of FIG. 3. FIG. 8 shows the Barker correlation for a symbol pattern [+1, −1]. It may be observed that the correlation is no longer symmetric about the peak. FIG. 9 shows the Barker correlation for a symbol pattern [−1, +1], which is also not symmetric about the peak. FIG. 10 shows the Barker correlation for a symbol pattern [−1, −1] which looks exactly like a left-shifted version of FIG. 4.

In the present example of using an eleven chip Barker spreading sequence to transmit a 1 Mbps sync symbol preamble, as long as the duration of the channel impulse response is less than eleven chips, there will only be four unique Barker correlation patterns calculated at the receiver. This effect becomes extended when the channel impulse response extends beyond the length of a single Barker sequence (here, eleven chips). If the duration of the channel impulse response extends beyond eleven chips, but less than twenty-three chips, the calculated Barker correlations will depend upon the current symbol as well as the previous two symbols. This can be seen by convolving an eleven chip Barker sequence with a fifteen chip channel impulse response. The result is twenty-five chips in length which affects parts of three different symbols. Considering the fact that the Barker correlations are shifted in order to obtain precursor information, the effect actually extends to the current symbol and the previous three symbols. Since the duration of the channel impulse response is not known until it is measured, in practice, it is necessary to estimate what may be termed a 'reasonably long' channel impulse response.

As a non-limiting example, consider the case of setting the complex taps of up to a maximum of a twenty-two tap equalizer. It is up to the implementation to determine how many of these taps will be treated as pre-cursor taps and how many will be post-cursor taps. For purposes of illustration, let it be initially assumed that the channel impulse response $h_k$ is known, having a negative echo occurring twelve chips after the primary path as follows:

$$h_k=[+1,0,0,0,0,0,0,0,0,0,0,0,-0.5,0,0,0,0,0,0,0,0,0].$$

FIG. 11 contains a Table that summarizes eight possible calculated Barker correlations at the receiver. In the Table, the data pattern order is left-to-right, with data symbol $d_0$ being transmitted first in time. The Barker correlations were aligned such that the peak was in the second bin from the left or bin $c_1$. It may be observed that conjugate data patterns, with sign correction, will produce the same Barker correlations. (The required sign correction is simply a multiplication of the calculated Barker correlation by the sign of data symbol $d_2$).

A relatively simple way to group these eight patterns is to determine whether the symbols change or not. The eight possible eleven-chip Barker correlations are grouped and accumulated into bins based on equation (4) as follows:

$$\text{bin}=4*(d_0\oplus d_1)+2*(d_0\oplus d_2)+(d_2\oplus d_3) \quad (4)$$

A count is maintained of the number of times each bin contains an accumulated Barker correlation. These accumulated bins need to be scaled by this count, so that each accumulated bin has the same relative magnitude. Given a sufficiently long data stream, all eight data difference patterns would appear in the symbol stream and all eight bins would be populated. This would result in the impractical solution of $[B]*[h]=[c]$ where B is (88×22), h is (22×1) and c is (88×1).

Figures 12, 13:
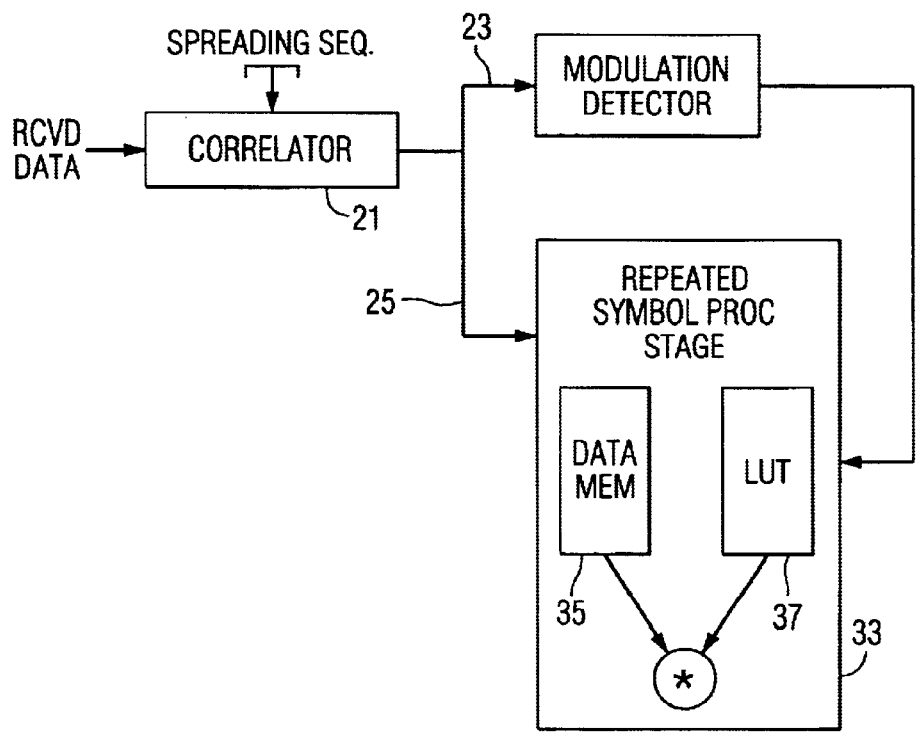
FIG. 12 shows a dimension (11×22) Barker matrix $B_{\_\_++}$.
FIG. 13 diagrammatically illustrates the general signal processing architecture of the symbol repetition-based mechanism of the invention for incorporation into the channel impulse response estimation processor of FIG. 1.

It may be recalled that the channel impulse response estimation must be carried out in parallel with frequency and phase estimation, antenna diversity, and other parametric value estimation. Due to the requirement for using as short a preamble as possible, the allowable observation time (in symbols per dwell) competes with other demands for time. From a practical standpoint, the first symbol of each dwell time is effectively lost due to AGC and settling. As a consequence, the channel impulse response estimation technique requires a minimum of five complete and consecutive symbols after settling, in order to accurately estimate up to twenty-two complex taps. For the case of only five useful symbols, the issue is how to populate the matrices, a layout for which is shown in FIG. 12.

For the six symbol dwell pattern $(d_0, d_1, d_2, d_3, d_4, d_5)$, the first symbol $d_0$ is lost due to AGC and settling, as described above. Operating a Barker correlator and a differential demodulator for the four next successive symbols $(d_1, d_2, d_3, d_4)$ produces one of eight possible Barker correlations (similar to those shown in the Table of FIG. 11), which may be denoted as $c_{--++}$. Once the four symbol pattern is known, the appropriate B matrix may be selected. The values for the B matrix may be populated in a similar fashion to the B matrix in FIG. 6. For purposes of illustration, it will assumed that the four symbol pattern $(d_1, d_2, d_3, d_4)$ was actually (−1, −1, +1, +1). The $B_{--++}$ matrix shown in FIG. 12 has the dimensions 11×22. From FIG. 6, it can be seen that the top right element of the $B_{--++}$ will be $b_0$, the top left element will be $b_{21}$, the bottom left element will be $b_{31}$, and the bottom right element will be $b_{10}$. The Barker cross-correlation elements $b_0$ through $b_{31}$ are pre-computed for all sixteen (eight when sign correction is performed) four-symbol sequences.

For the bottom half of the B and c matrix, performing Barker correlation and differential demodulation on the next symbol $d_5$ (having a value of −1, as a non-limiting example), using information from the previous three symbols ($d_2$, $d_3$, $d_4$), will produce a different one of eight possible Barker correlations, which may be termed $c_{-++-}$. Once this four symbol pattern $(d_2, d_3, d_4, d_5)$ has been determined, the appropriate B matrix may be selected. The $B_{-++-}$ matrix shown in FIG. 12 also has the dimensions 11×22. After these matrices are populated, the solution for the unknown channel impulse response values $h_0$ through $h_{21}$ is the same as that described above with reference to FIG. 6. For the case of any arbitrary (four bit) pattern, the sub-matrices $B_{WXYZ}$ and $C_{WXYZ}$ may be used to populate the different halves of the B and c matrix, so long as they are different and not inverted versions of each other.

From the foregoing illustration, it can be seen that the 'wait' time required to obtain sufficient data symbol estimates to obtain a reasonably accurate estimate of the channel impulse response may be compressed or reduced, by using (repeating) some sub-portion of a group or block $b_i$ of a prescribed number k of previously received data symbols to recreate or fill in a corresponding sub-portion of a subsequently received block $b_{i+1}$ of data symbols. This eliminates the processor having to wait for receipt of a longer k+m sequence of data symbol estimates required to solve an associated set of k+m linear equations that are used to define the channel impulse response (CIR).

FIG. 13 diagrammatically illustrates the general signal processing architecture of the symbol repetition-based mechanism described above for incorporation into the channel impulse response (CIR) estimation processor 16 of FIG. 1, that is used to set the complex taps of its associated DFE 14 during receipt of the preamble sequence within a relatively brief dwell interval, prior to commencement of an actual data transmission session. As shown in FIG. 13, for the present example of direct sequence spread spectrum communications, digitized data samples produced by the upstream A-D converter 12 (FIG. 1) are despread in a despreading correlator 21, to which the spreading sequence is applied. The resulting despread digital sample value is coupled over a pair of parallel signal transport paths 23 and 25—to a modulation detector 31 and to a repeated symbol processing stage 33, respectively. For the non-limiting example of using BPSK modulation, modulation detector 31 may output one of two possible binary values (a '1' or a '0' bit), in accordance with the polarity of a respective data value it receives from signal transport path 23. The repeated symbol processing stage 33 stores the actual values of the received data symbols supplied over the parallel signal transport path 25 in respective locations of an internal memory section 35.

In accordance with the invention, as a prescribed plurality k of a block $b_i$ of successively received data symbol values are received and stored in the memory 35, one or more of the most recent values of that block $b_i$ of k successive symbol values are repeated to form a front end portion of the next block $b_{i+1}$ of k successive values. As pointed out above, this repeated use of a selected number of symbol values of a respective block $b_i$ allows the data symbol values of the next successive block $b_{i+1}$ to be populated within a time duration than is less than for detecting all of k symbols of a next block $b_{i+1}$.

This selective repetition of one or more already received data symbols is diagrammatically illustrated in FIGS. 14–16. FIG. 14 shows successive memory addresses $m_1$, $m_2$ etc. of memory 35 containing successive symbols $s_1$, $s_2$, etc., as supplied thereto from the actual symbol value transport path 25. As shown in FIG. 15, the symbol contents $s_{k-m}$–$s_k$ of a prescribed number m of successive memory addresses $m_{k-m}$–$m_k$ of a first block $b_i$ of successive memory addresses $m_1$–$m_k$, containing k successive symbols $s_1$–$s_k$ are used to generate the first m symbols for the next block $b_2$ of k successive symbols. Namely, the first m respective symbols of the next block $b_2$ of k symbols will be the same symbols $s_{k-m}$–$s_k$ of the first block $b_1$, while the remaining k-m symbols of block $b_2$ will be the next k-m received symbols $s_{k+1}$–$s_{k+m}$, written into respective memory locations $m_{k+1}$–$m_{2k}$ of the memory 35.

For the reduced complexity, non-limiting example of solving a system of eight linear equations to estimate the channel, with k=4, and a single symbol repeat, then as shown in FIG. 16, repeating the fourth symbol $s_4$ of a first block $b_1$ as the first symbol of the next successive block $b_2$ means that it is only necessary to receive seven symbols $s_1$–$s_7$ to realize a total of eight symbols $s_1$, $s_2$, $s_3$, $s_4$, $s_4$, $s_5$, $s_6$, $s_7$ of a dual block $b_1+b_2$ of eight symbols required for performing the channel estimate matrix multiplication, described above with reference to FIG. 12. The matrices by which the blocks of actually received data symbols stored in memory 35 and selectively repeated as described are multiplied are precalculated and stored in memory 33 in association with all possible data symbol sequences that can be transmitted.

For the present example of eight symbols per calculation, memory 33 has a look-up table subsection 37 containing a total of $2^8$ or 256 different sets of precalculated matrices. As pointed out above, since the mutual influence of adjacent symbols within all possible (here $2^8$) symbol sequences can be determined apriori, the parameters of the precalculated matrices may be precalculated so as to remove the effects of sidelobes. For the eight symbols per linear equation set of the present example, the address of which prestored matrix set is accessed from the memory subsection 37 is defined in accordance with the particular binary symbol produced by the modulation detector 31 for the sequence of data values: $s_1$, $s_2$, $s_3$, $s_4$, $s_4$, $s_5$, $s_6$, $s_7$, While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of establishing a communication link between transmitter and receiver sites of a wireless digital data communication system comprising the steps of:
   at said transmitter site,
   (a) transmitting a preamble message containing a sequence of data symbols;
   at said receiver site,
   (b) receiving said preamble message transmitted in step (a);
   (c) processing said preamble message received in step (b) to derive estimates of data symbols of said sequence;
   (d) processing a first number of estimates of data symbols derived in step (c) to obtain a second number of estimates of data symbols, larger than said first number;
   (e) processing said second number of estimates of data symbols obtained in step (d) to generate an estimate of the channel over which said preamble message has been transmitted from said transmitter site to said receiver site; and
   (f) setting parameters of a signal processor by way of which a data message, transmitted by said transmitter site to said receiver site subsequent to said preamble message, is to be recovered, in accordance with said estimate of the channel generated in step (e).

2. A method according to claim 1, wherein step (d) comprises repeating at least one of said first number of estimates of data symbols derived in step (c) to obtain said second number of estimates of data symbols.

3. A method according to claim 1, wherein step (d) comprises distributing said estimates of data symbols derived in step (c) into successive blocks of plural sequential data symbol estimates per block, and wherein the value of a data symbol estimate of an ith block is employed as a data symbol estimate of a subsequent block.

4. A method according to claim 1, wherein step (d) comprises subdividing said estimates of data symbols derived in step (c) into successive blocks of plural sequential data symbol estimates per block, and wherein a last data symbol estimate of an ith block is employed as a first data symbol estimate of an (i+1)th block.

5. A method according to claim 1, wherein step (e) includes storing plural sets of predefined channel parameters associated with respectively different sequences of said second number of data symbol estimates, and processing said second number of estimates of data symbols obtained in step (d) using previously stored predefined channel parameters of said plural sets to generate said estimate of the channel.

6. A method of enabling a receiver to establish a communication link with a transmitter of a wireless digital data communication network comprising the steps of:
   (a) receiving a preamble message containing a sequence of data symbols that has been transmitted from said transmitter;
   (b) processing said preamble message received in step (a) to derive a first number of estimates of data symbols of said sequence;
   (c) repeating at least one of said first number of estimates of data symbols derived in step (b) to obtain a second number of estimates of data symbols, larger than said first number;
   (d) processing said second number of estimates of data symbols obtained in step (c) to generate an estimate of the channel over which said preamble message has been transmitted from said transmitter to said receiver; and
   (e) setting parameters of a signal processor by way of which a data message, transmitted by said transmitter to said receiver subsequent to said preamble message, is to be recovered, in accordance with said estimate of the channel generated in step (d).

7. A method according to claim 6, wherein step (c) comprises distributing said estimates of data symbols derived in step (b) into successive blocks of plural sequential data symbol estimates per block, and wherein the value of a data symbol estimate of an ith block is repeated as a data symbol estimate of a subsequent block.

8. A method according to claim 6, wherein step (c) comprises subdividing said estimates of data symbols derived in step (b) into successive blocks of plural sequential data symbol estimates per block, and wherein a last data symbol estimate of an ith block is repeated as a first data symbol estimate of an (i+1)th block.

9. A method according to claim 6, wherein step (d) includes storing plural sets of predefined channel parameters associated with respectively different sequences of said second number of data symbol estimates, and processing said estimates of data symbols obtained in step (c) using previously stored predefined channel parameters of said plural sets to generate said estimate of the channel.

10. A wireless communication apparatus comprising:
- a receiver which is operative to receive wireless communication signals that have been transmitted thereto over a communication channel from a transmitter and to produce digitized representations of received wireless communication signals;
- a digital signal processor, coupled to said receiver and being operative to process digitized representations of received wireless communication signals to recover digital data contained therein, said digital signal processor having operational parameters thereof established in accordance with an estimate of said communication channel; and
- a channel estimate generator, coupled to said receiver and to said digital signal processor, and being operative to process a preamble message containing a sequence of data symbols that has been transmitted over said communication channel from said transmitter and received by said receiver to derive estimates of data symbols of said sequence, and producing therefrom estimates of data symbols in which at least one of said data symbol estimates is repeated, and processing said data symbol estimates to generate said estimate of said communication channel.

11. A wireless communication apparatus according to claim 10, wherein said channel estimate generator is operative to distribute said estimates of data symbols into successive blocks of plural sequential data symbol estimates per block, and wherein the value of a data symbol estimate of an ith block is repeated as a data symbol estimate of a subsequent block.

12. A wireless communication apparatus according to claim 10, wherein said channel estimate generator is operative to subdivided said estimates of data symbols into successive blocks of plural sequential data symbol estimates per block, and wherein a last data symbol estimate of an ith block is repeated as a first data symbol estimate of an (i+1)th block.

13. A wireless communication apparatus according to claim 10, wherein said channel estimate generator includes memory which stores plural sets of predefined channel parameters associated with respectively different sequences of data symbol estimates, and wherein said channel estimate generator is operative to process said estimates of data symbols using predefined channel parameters of said plural sets stored in memory to generate said estimate of said communication channel.

* * * * *